Jan. 13, 1959     R. A. GAITHER     2,868,033

TORSION BAR ANTI-BACKLASH GEAR

Filed July 3, 1957

INVENTOR.
RAYMOND A. GAITHER

BY

ATTORNEYS

United States Patent Office 2,868,033
Patented Jan. 13, 1959

2,868,033

TORSION BAR ANTI-BACKLASH GEAR

Raymond A. Gaither, Pendleton, Ind.

Application July 3, 1957, Serial No. 669,902

2 Claims. (Cl. 74—440)

(Granted under Title 35, U. S. Code (1952), sec. 266)

The invention described herein may be manufactured and used by or for the Government of the United States of America for governmental purposes without the payment of any royalties thereon or therefor.

The present invention relates to anti-backlash gears and more particularly to a torsion bar anti-backlash gear device of the split gear type.

Gear trains are generally employed for one of two reasons, which is, to either transmit power or motion. When a gear train is used for transmitting motion, as for example in a servomechanism, it is important that backlash in the gear train be kept to a minimum, as it introduces error in the final result, which, by way of example, might be the launching of a missile or other projectile.

Various schemes have, in the past, been employed to reduce or eliminate backlash in gear trains. One commonly employed anti-backlash device is comprised of a first narrow width gear fixedly attached to a shaft, and a second narrow width gear rotatable on the same shaft and contiguous with the first gear. The first and second gears are resiliently biased together by means of pins and coil springs and are normally engaged with a third gear equal in width to the combined widths of the first and second gears. This commonly employed device, often called a split gear train, performs very satisfactorily in operation in reducing or eliminating backlash, but has a main disadvantage in that a large number of parts are required, some devices requiring as many as fifteen parts to make up a single assembly.

The anti-backlash device herein disclosed is of the split gear variety; however, the customary coil springs and retaining pins have been eliminated and a torsion bar system is employed to provide the necessary torque used in the split gear device.

It is an object of the present invention to provide an improved anti-backlash device that is relatively simple and inexpensive to make.

Other objects and advantages of this invention will be readily appreciated as the same becomes better understood by reference to the following detailed description when considered in connection with the accompanying drawing wherein.

Figure 1:
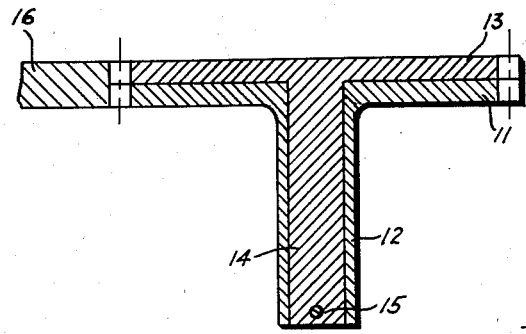
Fig. 1 is a sectional view showing one embodiment of a torsion bar anti-backlash gear.

Referring now to the drawing, there is shown in Fig. 1 one embodiment of the present invention wherein a spur gear 11 is integrally attached to a tubular shaft 12. A second spur gear 13, having the same diametral pitch and the same number of teeth as gear 11, is integrally attached to shaft 14. Shaft 14 is positioned within the bore of tubular shaft 12 and the outside diameter of shaft 14 and the bore of shaft 12 are preferably of such dimensions that a close running fit is obtained.

Figure 3:
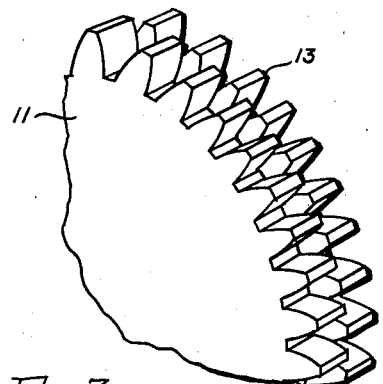
Fig. 3 is a fragmentary view showing the teeth arrangement in a split gear device.

The ends of shafts 12 and 14 opposite the ends the gears are attached, are secured together by suitable means such as a pin 15 shown in Fig. 1. It may be desirable to displace the teeth of gear 13 with respect to the teeth of gear 11, as shown in Fig. 3 of the drawing, prior to fastening the ends of shafts 12 and 14 together. It would then only be necessary to rotate gear 13 a distance equal to one-half a tooth pitch in order to permit a mating gear 16 to be engaged with gears 11 and 13. If greater torque is desired it is only necessary to rotate gears 11 and 13 relative to one another, additional teeth space, until the desired force is obtained. It may be desirable at times to rotate one gear a single tooth pitch with respect to the other gear, and the teeth on gears 11 and 13 should be aligned when the shafts are fastened together.

Figure 2:
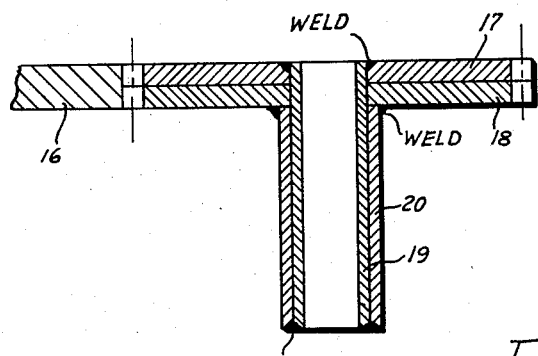
Fig. 2 is a sectional view showing another embodiment of the present invention.

In Fig. 2 of the drawing, another embodiment of the invention is shown wherein gears 17 and 18 are attached, as by welding, to tubular shafts 19 and 20, respectively. Shaft 19 is positioned within shaft 20 and the two shafts are fastened together as by pinning or welding.

In operation, gear 16, which is preferably equal in width to the combined widths of the two mating gears, is meshed with the anti-backlash gears, and it can be seen that as the two anti-backlash gears are tending to be rotated in opposite directions that they will have a wedging effect on the teeth of mating gear 16. Thus any backlash due to the manufacturing tolerances on the gears will be eliminated and furthermore, any wearing of the running surfaces will be automatically compensated by the wedging action of the teeth.

Obviously many modifications and variations of the present invention are possible in the light of the above teachings. It is therefore to be understood that the invention may be practiced otherwise than as specifically described.

What is claimed is:

1. In a gear train, first and second tubular shafts concentrically mounted one within the other, said first tubular shaft having an outside diameter substantially equal to the inner diameter of said second shaft with said first shaft being in contacting relationship throughout the entire length of said second shaft, first and second gears fixedly attached to the ends of said first and second tubular shafts, respectively, said first and second gears being in contacting relation one above the other and having the same diametral pitch and number of teeth thereon, a third gear substantially equal in width to the combined widths of said first and second gears and meshing with said first and second gears, and means for securing the tubular shaft end opposite said first gear to the tubular shaft end opposite said second gear whereby relative rotation between said first and second gear produces torsion in said tubular shafts.

2. In a gear train as set forth in claim 1 wherein said means for securing the tubular shaft end opposite said first gear to the shaft end opposite said second gear, comprises a pin transversely positioned through the longitudinal axes of said shafts.

References Cited in the file of this patent

UNITED STATES PATENTS

| | | |
|---|---|---|
| 1,517,199 | Delaporte | Nov. 25, 1924 |
| 2,641,937 | Erhardt et al. | June 16, 1953 |

FOREIGN PATENTS

| | | |
|---|---|---|
| 596,082 | Germany | Apr. 26, 1934 |